United States Patent

Andorf et al.

[11] Patent Number: 5,955,395
[45] Date of Patent: Sep. 21, 1999

[54] PREPARATION AND USE OF PT/ZEOLITE CATALYST MATERIALS FOR REMOVING CARBON MONOXIDE

[75] Inventors: Renato Andorf, Meckenbeuren; Werner Maunz; Carsten Plog, both of Markdorf; Thomas Stengel, Friedrichshafen, all of Germany

[73] Assignee: Mercedes-Benz AG, Stuttgart, Germany

[21] Appl. No.: 08/802,770

[22] Filed: Feb. 21, 1997

[30] Foreign Application Priority Data

Feb. 21, 1996 [DE] Germany .................. 196 06 286

[51] Int. Cl.$^6$ .................................................. B01J 29/068
[52] U.S. Cl. ................................... 502/74; 423/246
[58] Field of Search .................................................. 502/74

[56] References Cited

U.S. PATENT DOCUMENTS

| | | | |
|---|---|---|---|
| 4,556,646 | 12/1985 | Bezman | 502/74 |
| 4,568,656 | 2/1986 | Poeppelmeier et al. | 502/74 |
| 4,699,894 | 10/1987 | Santilli et al. | 502/74 |
| 4,882,307 | 11/1989 | Tsao | 502/74 |
| 4,912,072 | 3/1990 | Mallouk et al. | 502/74 |
| 5,166,112 | 11/1992 | Holtermann | 502/74 |
| 5,416,052 | 5/1995 | De Agudelo et al. | 502/74 |
| 5,434,114 | 7/1995 | Weitkamp et al. | 502/74 |

FOREIGN PATENT DOCUMENTS

| | | |
|---|---|---|
| 0 306 237 | 3/1989 | European Pat. Off. |
| 0 501 507 | 9/1992 | European Pat. Off. |
| 0 650 922 | 5/1995 | European Pat. Off. |
| 0 764 466 | 3/1997 | European Pat. Off. |
| 1 273 511 | 7/1968 | Germany . |
| 2 230 615 | 12/1972 | Germany . |
| 37 16 446 | 12/1988 | Germany . |
| 43 34 981 | 4/1995 | Germany . |
| 43 34 983 | 4/1995 | Germany . |
| 92-119924 | 2/1992 | Japan . |
| 4-235743 | 8/1992 | Japan . |
| 1 404 641 | 9/1972 | United Kingdom . |

OTHER PUBLICATIONS

Patent Abstract of JP 5317722, Patent date: Dec. 3, 1993.

*Primary Examiner*—Wayne Langel
*Attorney, Agent, or Firm*—Evenson, McKeown, Edwards & Lenahan, P.L.L.C.

[57] ABSTRACT

The invention relates to a process for preparing a Pt/zeolite catalyst material, the material itself, and the use of the material in removing carbon monoxide from a gas. In a preferred embodiment, the invention relates to a process for preparing a Pt/zeolite catalyst material for the catalytic removal of CO in $H_2$-rich gas by means of selective CO oxidation and the use of such a catalyst material. The catalyst materials of the invention can be prepared by employing $Pt(NH_3)_4Cl_2 \cdot H_2O$ and a zeolite material. The resulting material can be used for the catalytic removal of CO from an $H_2$-rich outlet gas mixture from a methanol reforming reactor. The compositions and methods to produce catalytic materials result in products with high and prolonged catalyst activity. In particular, the methods and compositions of the invention can be used in removing CO from the hydrogen fed to fuel cells in electric vehicles having stored methanol fuel.

10 Claims, 2 Drawing Sheets

PREPARATION AND USE OF PT/ZEOLITE CATALYST MATERIALS FOR REMOVING CARBON MONOXIDE

This application claims the priority of German patent application 196 06 286.1, filed Feb. 21, 1996, the disclosure of which is expressly incorporated by reference herein.

BACKGROUND OF THE INVENTION

1. Field of the Invention

The invention relates to Pt/zeolite catalyst materials.

2. Description of Related Art

Developing alternative fuels for motor vehicles has become an increasingly important goal for the automotive industry. In one type of fuel cell, methanol is used as a stored fuel and the combustion fuel, hydrogen, is obtained from methanol. A methanol reforming reactor, known in the art, produces hydrogen from methanol. However, for fuel cell applications, the outlet gas mixture from a methanol reforming reactor usually has an undesireably high carbon monoxide (CO) content.

One possible solution to this problem involves catalytically removing CO by selective oxidation. Reactors and processes suitable for this purpose are disclosed, for example, in published German applications DE 43 34 981 and DE 43 34 983. The $Pt/Al_2O_3$ catalysts disclosed therein are useful for the selective oxidation of CO. However, in certain applications, such as at the optimum operating temperature of about 110° C., these catalysts are subject to slow poisoning from CO occupying the catalytically active center. This leads to an intolerable rise in the CO starting concentration, even after relatively short operating times.

In the above-mentioned German applications, the use of a Pt/zeolite catalyst material has been proposed. However, the Pt/zeolite catalyst materials obtainable to date have not yet shown a satisfactory effect in reducing CO levels. Accordingly, there is a need in the art for methods and compounds to reduce the CO content from methanol reforming reactors that produce hydrogen, especially in fuel cell applications.

Platinum/zeolite catalysts have already been used in the automobile industry, however, that use has been in the treatment of exhaust. For example, an abstract of Japanese application JP 5317722 A discusses the use of Pt/zeolite catalyst material for removing nitrogen oxides from the exhaust gas of combustion engines. Also, published German application DE 37 16 446 A1 discusses a process for preparing a Pt/zeolite catalyst material intended for use in a diesel soot filter. The filter has a catalytically active coating for the purpose of reducing the ignition temperature.

Platinum/zeolite catalysts have also been used in methods for preparing certain chemical compounds. For example, processes for preparing Pt/zeolite catalyst materials for the hydroisomerization of hydrocarbons or for the dehydrogenation of alkanes are described in German applications DE 1 273 511 and DE 2 230 615. Also, in a method for preparing a diester of carbonic acid, published European application EP 0 501 507 A2 discusses the use of zeolite catalyst materials containing ions of a metal of the platinum group. In the use of these catalysts, carbon monoxide is brought into contact with a nitrite in gas phase in the presence of the catalyst. The European application notes a number of possible ways of preparing the Pt/zeolite catalyst materials.

Thus, while Pt/zeolite catalyst materials have been used in certain applications, their successful use to reduce CO levels for fuel cells providing hydrogen from methanol has not been disclosed.

SUMMARY OF THE INVENTION

It is an object of the invention to provide methods for removing CO from a $H_2$-rich atmosphere using a suitable Pt/zeolite catalyst material. Generally, the aspect of removing the CO involves the selective oxidation of CO through the use of a Pt/zeolite catalyst.

Another aspect of the invention involves the preparation of Pt/zeolite catalyst materials, which can be used in reducing CO levels, and the Pt/zeolite catalyst materials produced by the methods. In a preferred embodiment, the methods of preparing Pt/zeolite catalyst material comprise dissolving $Pt(NH_3)_4Cl_2 \cdot H_2O$ in distilled water, adding a zeolite material to form a suspension, stirring the suspension and subsequently filtering it, washing it free of chloride and drying it, gradually heating the dried material to a temperature of about 400° C. in an atmosphere of $N_2$, reducing the heated material by adding activating gas for about 4 hours at about 400° C., and cooling the reduced material in an atmosphere of $N_2$. Studies have shown that the use of a Pt/zeolite catalyst material prepared by the methods of this invention have an unexpectedly high activity in the catalytic removal of carbon monoxide from a hydrogen-rich outlet gas mixture, for example, gas from a methanol reforming reactor. This high activity can be maintained over prolonged operating times.

The catalyst material can be used on metallic or ceramic supports as pellets or spheres. Materials having a platinum content between about 0.5% by mass and about 5.0% by mass are particularly suitable.

In another aspect of the invention, compositions for reducing CO concentrations in a gas are provided. The compositions comprise a Pt/zeolite catalyst, such as the material discussed above.

The preferred zeolite type used is a Y zeolite, which is in the Na form and has a very small modules of less than six. As known in the art, "module" characterizes the ratio of metal component to that of Si in a zeolite. Here, the Na/Si ratio is abput 6 or less. A NaY zeolite, for example, is known in the art to represent a Y zeolite with a Na metal component incorporated in the Si crystal structure. Several types of Y zeolite are known in the art. Also, a PtNaY zeolite is a Y zeolite in which some of the Na sites are occupied by Pt.

Owing to the high activity of the catalyst material prepared according to the invention in comparison with conventional $Pt/Al_2O_3$ catalyst materials, the associated catalytic reactor can be constructed so as to be comparatively compact and have a low weight, so that it is particularly suitable for use in mobile systems such as passenger, commercial, and space vehicles. In addition, variation in the type of zeolite used allows the optimum operating temperature to be matched to the respective system requirements. A number of Pt/zeolite compositions have been produced for other purposes and can be used in accordance with this invention. (See German applications DE 1 273 511, DE 37 16 446 and DE 2 230 615, Japanese application JP 5317722, and EPA application EP 0 501 507, all specifically incorporated herein by reference).

Another preferred embodiment involves producing a particularly suitable catalyst material in the form of a Pt/NaY zeolite containing 1% by mass of platinum as well as the Pt/zeolite catalyst composition produced. The method to produce the catalyst material comprises the method disclosed above wherein certain conditions have been optimized, such as 0.903 g of $Pt(NH_3)_4Cl_2 \cdot H_2O$ are dissolved per 1000 ml of distilled water, 50 g of NaY zeolite material are added per 1000 ml, the stirring time is 24 hours and the drying temperature is 120° C., the gradual heating is carried out as a uniform rate of 4° K./min, and the activating gas comprises 5% by volume of $H_2$ in $N_2$.

Further preferred embodiments of the invention are described below.

Although the invention has been described and illustrated in detail, it is to be clearly understood that the same is by way of illustration and example, and is not to be taken as a limitation to the scope of the invention. The spirit and scope of the invention are to be limited only by the appended claims.

DETAILED DESCRIPTION AND CERTAIN EMBODIMENTS OF THE INVENTION

Figure 1:
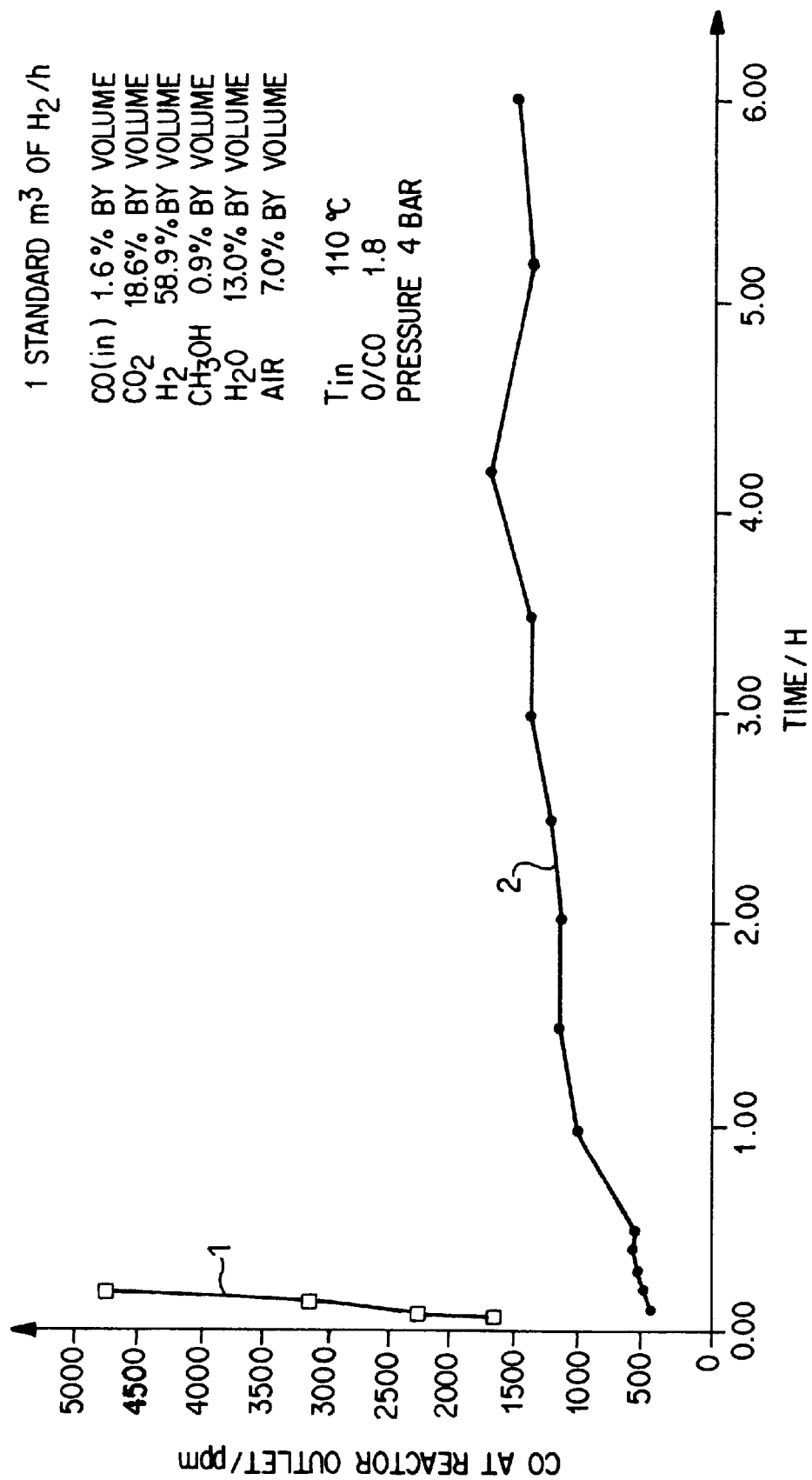
FIG. 1 shows a graph illustrating the long-term operating behavior of a Pt/NaY zeolite catalyst material prepared according to the invention in comparison to that of a conventional Pt/$Al_2O_3$ catalyst material.

FIG. 1 shows a graph of the CO content at the outlet of a reactor for the catalytic removal of CO from the $H_2$-rich outlet gas mixture from an upstream methanol reforming reactor as a function of the operating time. The CO concentration serves as a measure for the inverse catalyst activity. Typical gas mixture parameters are shown in the insert of the graph of FIG. 1. The use of a conventional Pt/$Al_2O_3$ catalyst material having a platinum content of 5% by mass gives a line (1) from which it can be seen that the CO content rises very sharply, even within a very short operating time of about 15 minutes from about 1700 ppm to over 4500 ppm. In contrast, in line (2), obtained for a PtNaY zeolite catalyst material prepared according to the invention and having a platinum content of 1% by mass, shows very stable long-term behavior with comparatively high catalyst activity. Thus, the CO content of the gas mixture leaving the reactor for the catalytic CO removal is even initially at about 500 ppm more than a factor of three less than when using the Pt/$Al_2O_3$ material and even after an operating time of about 6 hours rises only to a comparatively low final level of about 1500 ppm. This study shows the unexpected and surprising improvement in the level and the long-term stability of the catalyst activity for the PtNaY zeolite catalyst material prepared according to the invention in comparison with the conventional Pt/$Al_2O_3$ material.

Methanol reforming reactors that may be used with the present invention include the two-stage reactor arrangement having an upstream methanol reforming reactor stage and a downstream reactor stage for the selective oxidation of CO and are known in the art (see for example, German applications DE 43 34 981 and DE 43 34 983, and corresponding U.S. Application Ser. No. 08/323,217 and 08/323,216, both filed Oct. 14, 1994, all specifically incorporated herein by reference). In particular, such two-stage reactor arrangements are customary for obtaining hydrogen for fuel cells in motor vehicles from the methanol stored in the motor vehicle. The catalyst material of the invention can be installed in the reactor in a number of ways, including catalyst pack structures.

The PtNaY zeolite catalyst material described in FIG. 1 can be prepared as follows: 0.903 g of Pt$(NH_3)_4Cl_2 \cdot H_2O$ are dissolved in 1000 ml of distilled water. Then 50 g of NaY zeolite catalyst material are suspended in this solution, and the suspension is stirred for 24 hours at room temperature, subsequently filtered, washed free of chloride and dried at 120° C. The powder is then reduced by first heating it uniformly at a rate of 4 K/min from 20° C. to 400° C. in an atmosphere of $N_2$, then reducing it at 400° C. for 4 hours under the action of activating gas containing 5% by volume of $H_2$ in $N_2$ and finally cooling it again from 400° C. to 20° C. in an atmosphere of $N_2$. Varying the amounts in the suspension enables Pt/zeolite materials having different platinum contents to be obtained, with a platinum content of between 0.5% by mass and 5.0% by mass being found to be particularly effective for the application of the catalytic CO removal from an $H_2$-rich gas.

Figure 2:
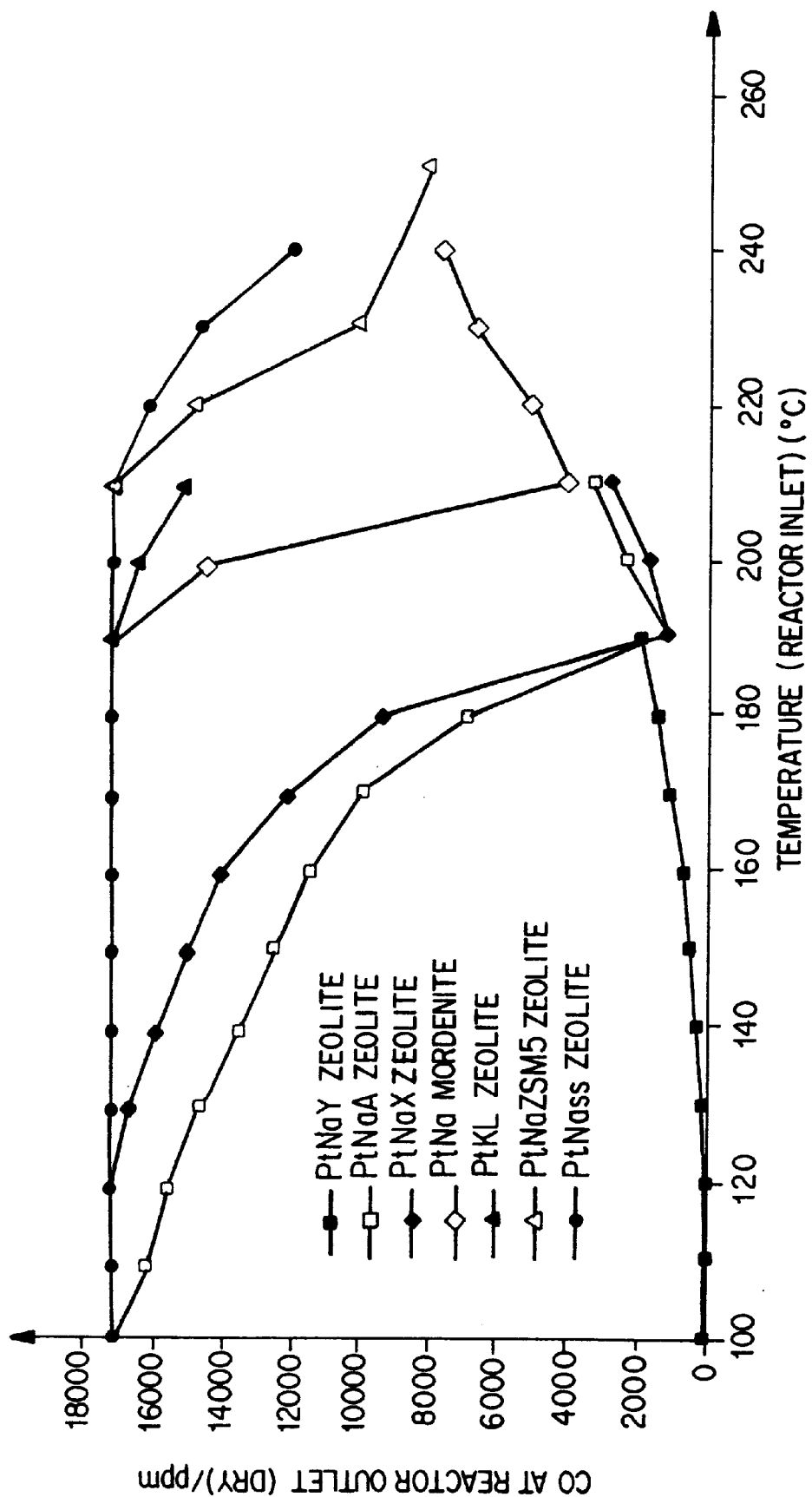
FIG. 2 shows a graph illustrating the catalytical activity as a function of the temperature for various Pt/zeolite catalyst materials prepared according to the invention. The horizontal axis represents the temperature of the gas entering the reactor, which, after a period of time, also represents the temperature of the Pt/zeolite catalyst material.

Variation of the zeolite material enables the optimum operating temperature to be matched to the respective application. The graph of FIG. 2 shows the dependence of the CO outlet concentration of the reactor carrying out the catalytic, selective CO oxidation on the reactor inner temperature as a measure of the reaction temperature for a plurality of zeolite materials, with the insert of the graph indicating the assignment of the various zeolite materials to the individual marked lines. Each of the zeolites noted are known in the art and can be used in preparing the Pt/zeolite materials of the invention.

The most important reactor parameters are indicated above the graph. It is shown that the Pt/NaY zeolite material results in the lowest CO concentrations, with the optimum working range of this catalyst being in the temperature range between 110° C. and 140° C. Appropriate selection of a zeolite material enables the optimum working temperature to be changed and thereby matched to the respective system requirements. Thus, for example, an optimum working temperature of about 210° C. is observed for the PtNa mordenite catalyst material. Accordingly, depending on the desired optimum working temperature, Pt/zeolite composition can be selected with an appropriate zeolite so that CO removal is the highest within the optimum working temperature range. One skilled in the art can perform tests, as described herein, to determine the most suitable Pt/zeolite catalyst material for a particular temperature range.

The Pt/zeolite catalyst materials of the invention can be used for removing CO from an outlet gas mixture of a methanol reforming reactor by means of selective CO oxidation. The CO concentration, which can be up to 2% by volume at the outlet of the methanol reforming reactor, is reduced to below 4000 ppm while the catalyst activity, which is high even at the beginning, is maintained over relatively long operating times of up to at least 8 hours. An important application is in the preparation of hydrogen having a very low CO content for fuel cells of electric vehicles. The invention provides methods for preparing Pt/zeolite catalyst materials, which can be used in reducing the CO content from a two-stage methanol reforming reactor. In the outlet gas mixture from the first stage, CO concentrations can be reduced from a maximum of about 2% by volume to about 1500 ppm, and in the second stage to below 40 ppm. These results demonstrate the ability of the methods and compositions of the invention to reduce CO levels in a gas.

We claim:

1. A method for preparing a Pt/zeolite catalyst material comprising the following steps:

(a) dissolving Pt$(NH_3)_4Cl_2 \cdot H_2O$ in distilled water;

(b) adding a zeolite material to the solution of (a), thereby producing a suspension;

(c) stirring the suspension and subsequently filtering it, washing it free of chloride, and drying it;

(d) gradually heating the dried material to a temperature of about 400° C. in an atmosphere of $N_2$;

(e) reducing the heated material by adding activating gas for about 4 hours at about 400° C.; and (f) cooling the reduced material in an atmosphere of $N_2$.

2. The method of claim 1, wherein, in step (a) about 0.9 g of $Pt(NH_3)_4Cl_2 \cdot H_2O$ are dissolved per about 1000 ml of distilled water, in step (b) about 50 g of NaY zeolite material are added per about 1000 ml, in step (c) the stirring time is approximately 24 hours and the drying temperature is about 120° C., and in step (d) the gradual heating is carried out as a uniform rate of about 4° K./min and the activating gas comprises approximately 5% by volume of $H_2$ in $N_2$.

3. The method according to claim 1, wherein the material is reduced by heating it in the $N_2$ atmosphere in step (d).

4. The method according to claim 1, wherein the $Pt(NH_3)_4Cl_2 \cdot H_2O$ is dissolved in a concentration of about 0.9 g per 1000 ml of distilled water.

5. The method according to claim 1, wherein about 50 g of NaY are added as the zeolite material per 1000 ml water.

6. The method according to claim 1, wherein stirring in step (c) is performed for about 24 hours.

7. The method according to claim 1, wherein drying in step (c) is performed at a temperature of about 120° C.

8. The method according to claim 1, wherein the gradual heating takes place at a rate of about 4° K./minute.

9. The method according to claim 1, wherein the activating gas comprises 5% by volume $H_2$ in $N_2$.

10. The method according to claim 1, wherein the zeolite is selected from the group consisting of NaY zeolite, NaX zeolite, Na mordenite, KL zeolite, NaZSM5 zeolite and Naβ zeolite.

* * * * *